(12) United States Patent
Lejeune et al.

(10) Patent No.: US 9,874,130 B2
(45) Date of Patent: Jan. 23, 2018

(54) VEHICLE INTERNAL COMBUSTION ENGINE ARRANGEMENT COMPRISING A WASTE HEAT RECOVERY SYSTEM FOR COMPRESSING EXHAUST GASES

(75) Inventors: Marc Lejeune, Lyons (FR); Dimitri Lortet, Lyons (FR)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/396,120

(22) PCT Filed: May 10, 2012

(86) PCT No.: PCT/IB2012/001153
§ 371 (c)(1),
(2), (4) Date: Oct. 22, 2014

(87) PCT Pub. No.: WO2013/167930
PCT Pub. Date: Nov. 14, 2013

(65) Prior Publication Data
US 2015/0083056 A1     Mar. 26, 2015

(51) Int. Cl.
*F01N 5/02* (2006.01)
*F01K 15/02* (2006.01)
(Continued)

(52) U.S. Cl.
CPC .............. *F01N 5/02* (2013.01); *F01K 15/02* (2013.01); *F01K 23/065* (2013.01);
(Continued)

(58) Field of Classification Search
CPC ...... F01N 5/02; F01N 226/06; F01N 2240/02; F02B 37/004; F02B 37/10; F02G 5/02; Y02T 10/16; Y02T 10/144; Y02T 10/166
(Continued)

(56) References Cited

U.S. PATENT DOCUMENTS 5,937,651 A * 8/1999 Braun ............... F02B 37/005
                                            60/605.2
7,469,540 B1 * 12/2008 Knapton ............. F01K 25/106
                                             60/618
(Continued)

FOREIGN PATENT DOCUMENTS

EP            2381073 A1     10/2011
WO     2011035967 A1      3/2011

OTHER PUBLICATIONS

Machine translation of Detailed Description for CH701133, Schmid, published Nov. 30, 2010, obtained from https://worldwide.espacenet.com, pp. 1-9.*
(Continued)

*Primary Examiner* — Grant Moubry
(74) *Attorney, Agent, or Firm* — WRB-IP LLP

(57) ABSTRACT

A vehicle internal combustion engine arrangement includes an internal combustion reciprocating piston engine, and an exhaust line capable of collecting exhaust gases from the engine, a waste heat recovery system carrying a working fluid in a loop, in which the working fluid is successively compressed, heated in a heat exchanger by at least one engine fluid, and expanded in a first expander, a first compressor located in the exhaust line and mechanically connected to the first expander of the waste heat recovery system.

13 Claims, 1 Drawing Sheet

(51) Int. Cl.
  *F01K 23/06* (2006.01)
  *F02G 5/02* (2006.01)
  *F02B 37/00* (2006.01)

(52) U.S. Cl.
  CPC .............. *F02B 37/004* (2013.01); *F02G 5/02* (2013.01); *F01N 2240/02* (2013.01); *F01N 2260/06* (2013.01); *F01N 2610/06* (2013.01); *Y02T 10/144* (2013.01); *Y02T 10/16* (2013.01); *Y02T 10/166* (2013.01)

(58) Field of Classification Search
  USPC .......................................................... 123/22
  See application file for complete search history.

(56) References Cited

U.S. PATENT DOCUMENTS

| | | | | |
|---|---|---|---|---|
| 7,490,462 B2* | 2/2009 | Roozenboom | ...... | F02B 29/0412 123/562 |
| 8,522,756 B2* | 9/2013 | Vuk | .......... | F01N 5/04 123/568.12 |
| 8,635,870 B2* | 1/2014 | Kasuya | ................... | F01K 15/02 60/616 |
| 8,752,378 B2* | 6/2014 | Ernst | ..................... | F01K 23/065 60/286 |
| 8,776,517 B2* | 7/2014 | Ernst | ......................... | F01K 9/04 60/39.182 |
| 8,881,523 B2* | 11/2014 | Kasuya | ................... | F01K 13/02 60/618 |
| 8,919,123 B2* | 12/2014 | Gibble | ...................... | F01K 7/40 60/320 |
| 2003/0154716 A1* | 8/2003 | Redon | ................. | F02D 41/0065 60/605.2 |
| 2009/0314005 A1* | 12/2009 | Messmer | ........................ | 60/792 |
| 2010/0064685 A1* | 3/2010 | Auffret | ............... | F02B 29/0412 60/602 |
| 2010/0146967 A1* | 6/2010 | Simpson | ................. | F02B 37/00 60/605.2 |
| 2010/0307155 A1* | 12/2010 | Kasuya | ................. | F01K 23/065 60/666 |
| 2011/0094485 A1 | 4/2011 | Vuk et al. | | |
| 2011/0209473 A1* | 9/2011 | Fritz | ..................... | F01K 23/065 60/605.2 |
| 2012/0285167 A1* | 11/2012 | Horek | ....................... | F28D 9/00 60/618 |
| 2013/0067910 A1* | 3/2013 | Ishiguro | ................ | F01K 23/065 60/597 |
| 2013/0074497 A1* | 3/2013 | Mori | ....................... | F01K 23/10 60/615 |

OTHER PUBLICATIONS

International Search Report (dated Jan. 16, 2013) for corresponding International Application PCT/IB2012/001153.

* cited by examiner

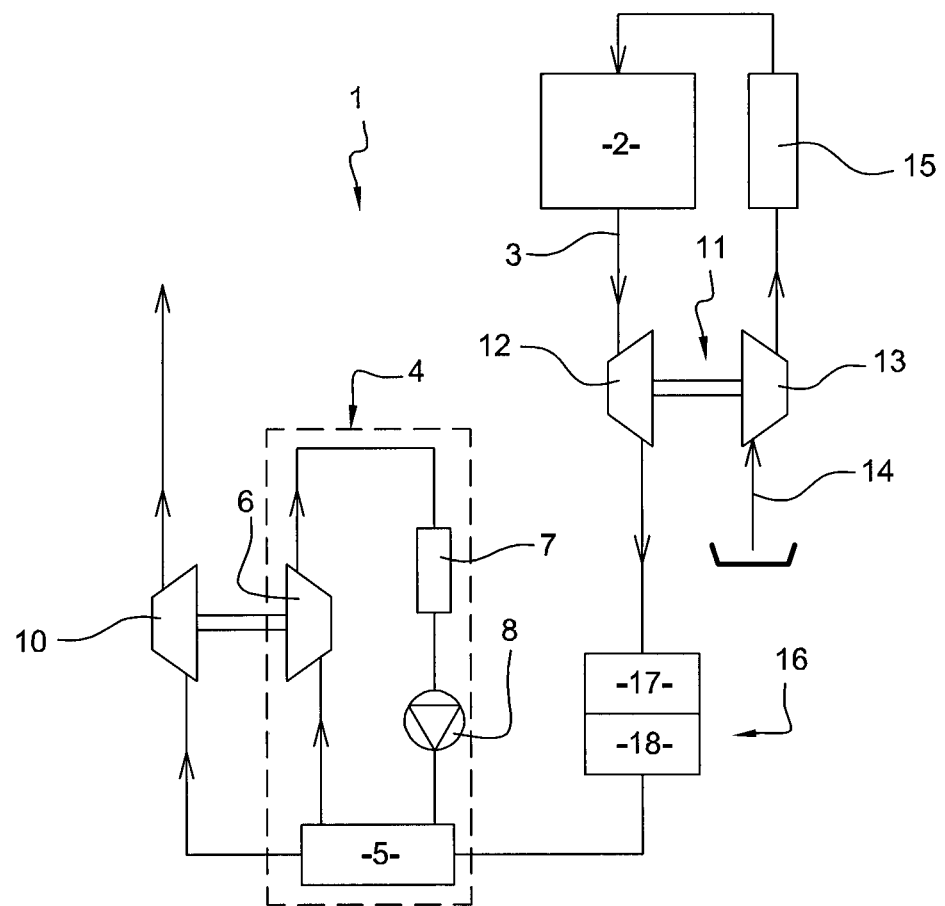

is converted by the waste heat recovery
VEHICLE INTERNAL COMBUSTION ENGINE ARRANGEMENT COMPRISING A WASTE HEAT RECOVERY SYSTEM FOR COMPRESSING EXHAUST GASES

BACKGROUND AND SUMMARY

The present invention relates to a vehicle internal combustion engine arrangement, and more specifically to such an arrangement comprising a waste heat recovery system.

For many years, attempts have been made to improve the efficiency of internal combustion engines, which has a direct impact on fuel consumption.

For this purpose, it has long been proposed to provide vehicles with an engine arrangement equipped with a waste heat recovery system, i.e. a system making use of the thermal energy which is contained in hot exhaust gases or in other engine hot fluids and which would otherwise be lost.

One example of a waste heat recovery system is a Rankine circuit.

In such a circuit, a working fluid flows in a closed loop and undergoes successive processes according to the Rankine thermodynamic cycle:
- the working fluid, which is a liquid at this stage, is pumped or compressed from low to high pressure;
- the high pressure working liquid is evaporated into a gas by a hot engine fluid flowing in another circuit of the engine arrangement;
- the working gas is expanded in an expander;
- finally, the working gas is condensed.

As a result, at least part of the thermal energy of the hot fluid used to evaporate the Rankine fluid is recovered in the expander under the form mechanical energy. It is conventional to transform that mechanical energy into electricity thanks to a generator driven by the expander.

However, in many applications, the electricity produced with this system may exceed the electrical needs of the vehicle and, consequently, may not be fully used.

On the other hand, using the energy recovered by this system in the form of mechanical energy, for example by connecting the expander to the driveline of the vehicle, may involve the implementation of additional complex systems, which would make the arrangement more complex, would require space and ultimately bring weight and cost.

It therefore appears that engine arrangements comprising a waste heat recovery system which have been proposed for vehicles are not fully satisfactory and can be improved.

It is desirable to provide an improved internal combustion engine arrangement which can overcome the above mentioned drawbacks.

More specifically, it is desirable to provide an internal combustion engine arrangement for a vehicle comprising a waste heat recovery system which can allow better use of the energy recovered from the exhaust gases.

According to an aspect of the invention, such an internal combustion engine arrangement comprises:
- an internal combustion reciprocating piston engine, and an exhaust line capable of collecting exhaust gases from said engine;
- a waste heat recovery system carrying a working fluid in a loop, in which said fluid is successively compressed, heated in a heat exchanger by means of the exhaust gases, and expanded in a first expander;
- a first compressor located in the exhaust line and mechanically connected to the first expander of the waste heat recovery system.

Thus, in an internal combustion engine arrangement according to an aspect of the invention, the thermal energy of at least one engine fluid, such as the engine exhaust gases, EGR gases, engine cooling fluid, lubrication fluid, charged intake air, etc. . . . is converted by the waste heat recovery system into mechanical energy by the expander and is transferred in mechanical form from the expander of said waste heat recovery system towards a compressor provided in the exhaust line.

The recovered energy is used to compress the exhaust gases, or more particularly to benefit from the suction effect at the input of the compressor, in order to reduce the exhaust back pressure on the engine which is prejudicial to the engine efficiency. Such back pressure is all the more high as a fairly high number of devices are now commonly arranged in the exhaust line for various purposes, such as for reducing air pollution, for reducing noise and/or for recovering energy.

Therefore, the energy needed for reducing the exhaust back pressure is recovered by means of the waste heat recovery system without needing an intermediate form of energy transfer other than the mechanical energy transfer from the expander to the compressor.

Another advantage of an aspect of the invention is that it does not require expensive or complex implementations to connect the expander of the waste heat recovery system to the first compressor.

BRIEF DESCRIPTION OF THE DRAWINGS

The following detailed description of an embodiment of the invention is better understood when read in conjunction with the appended drawing, it being however understood that the invention is not limited to the specific embodiment disclosed.

FIG. 1 is a schematic drawing of an engine arrangement according to the invention.

DETAILED DESCRIPTION

The automotive vehicle internal combustion engine arrangement 1 according to the invention comprises an internal combustion reciprocating piston engine 2, which can be a diesel engine or a spark ignition engine. The invention relates in particular, but not exclusively, to industrial vehicles such as heavy trucks.

An exhaust line 3 is provided for collecting exhaust gases from said engine 2 and for directing their them towards various devices before they are released into the atmosphere.

The engine arrangement 1 also comprises a waste heat recovery system 4 carrying a working fluid in a loop.

In the illustrated embodiments, the waste heat recovery system 4 is of the Rankine type, where the working fluid is carried in a closed loop, with a condenser for condensing the working fluid between the expander and the compressor. However, other types of waste heat recovery system are possible, such as, for example, systems of the Stirling type. It is also possible to implement the invention, including all variants herein described, with a Brayton type waste heat recovery system where the working fluid, usually air, is carried in an open loop. In a Brayton type system, air can be discharged to the atmosphere after being expanded while fresh air is absorbed by the compressor. In all cases, the working fluid for the heat recovery system does not circulate through the internal combustion engine.

In the embodiment shown in FIG. 1, the waste heat recovery system 4 comprises a heat exchanger 5 in which the working fluid can be heated by means heat transfer from at least one hot heat engine fluid. For example, the working fluid can be directly heated by said exhaust gases passing through the heat exchanger 5. In the disclosed embodiment, the heat exchanger 5 is located in the exhaust line 3. In other words, the working fluid flowing in the waste heat recovery system 4 is heated by the exhaust gases flowing in the exhaust line 3 towards the atmosphere.

This heat exchanger 5 can comprise a boiler in which the fluid flowing in the system 4 is evaporated by the hot exhaust gases flowing in the exhaust line 3.

Whatever the type of waste heat recovery system is used, other engine fluids could be used to heat the working fluid, including EGR gases, which are a portion of the exhaust gases, engine cooling fluid, lubrication fluid, charged intake gases, etc. . . . In such a case, the heat exchanger would be located on a line carrying the relevant fluid. The system could in fact comprise several heat exchangers in which the working fluid would be heated either by the same engine fluid, or by different engine fluids. Those several heat exchangers would typically be arranged in series in the waste heat recovery loop, but could also be arranged in parallel.

Downstream from the heat exchanger 5, the gas flows through a first expander 6. The first expander 6 can be a turbine, a piston machine, a scroll expander, a screw expander, etc., all of which are capable of recovering the energy of the heated and pressurized gas and of transforming it into mechanical energy.

In a Rankine type circuit, downstream from the first expander 6, the gas, which has been expanded and thereby cooled, can flow towards a condenser 7 in which it becomes a liquid again. Downstream from the condenser 7, the fluid—as a liquid—will be compressed before entering the heat exchanger 5, for example by means of a pump or compressor 8. In the pump 8, the fluid is pumped from low to high pressure, and then directed towards the heat exchanger 5. The Rankine system could be more elaborated and could for example comprise an additional heat exchanger in which the working fluid coming out of the pump is preheated by working fluid coming out of the expander.

According to the invention, there is provided a first compressor 10 located in the exhaust line 3. Said first compressor 10, which can be for example of the centrifugal type, is mechanically driven by the first expander 6 of the waste heat recovery system 4. As a result, the exhaust back-pressure for the engine is lowered, resulting in lower pumping, losses for the engine, and consequently higher efficiency.

Preferably, the first compressor 10 can be directly mechanically driven by the first expander 6 of the waste heat recovery system 4, for example with both the first expander and the first compressor being arranged on a common shaft and driven by said shaft. Such arrangement is compact and simple, and can be installed remote from the engine.

Alternatively, the mechanical connection between the first expander 6 of the waste heat recovery system and the first compressor 10 could include a mechanical transmission, for example including a belt and pulley transmission, a gearing transmission, etc. . . . Such a transmission could allow the first expander 6 and the first compressor 10 to be physically spaced apart on the vehicle. Such a mechanical transmission could also include a speed reduction or multiplication system, a gearbox, a hydraulic coupler, a continuously variable ratio transmission, etc., so as to allow each of them to operate in their respective optimum speed range.

In the case where the heat exchanger 5 is located in the exhaust line, the first compressor 10 can be located downstream from the heat exchanger 5.

The engine arrangement 1 can further comprise a turbocharger 11. Said turbocharger 1 includes a second expander 12, such as a turbine, which is driven by the exhaust gases flowing towards the atmosphere. The second expander 12 is located in the exhaust line 3, preferably upstream from the heat exchanger 5 of the waste heat recovery system 4. Furthermore, the turbocharger 11 includes a second compressor 13 which is mechanically connected to the second expander 12. The second compressor 13 is located in an air intake line 14. Thus, air is compressed before entering the engine 2. The air intake line 14 may further include a charge air cooler 15.

As shown in FIG. 1 the first compressor 10 can preferably be independent from any expander located in the exhaust line 3. That is to say, in particular, that said first compressor 10 is not driven by the second expander 12 of the turbocharger 11.

Besides, the engine arrangement 1 can comprise an exhaust after treatment system 16 located in the exhaust line 3 and including several units in order to reduce air pollution and meet legal requirements.

The units can comprise:
a diesel oxidation catalyst (not shown)
a diesel particulate filter 17, which is intended to remove un-burnt particles contained in the exhaust gases;
and/or a selective catalyst reduction device 18 which is used to treat nitrogen oxides (NOx) contained in the exhaust gases by converting them into water and nitrogen, which are both non toxic substances.

In a case where the heat exchanger of the waste heat recovery system 4 is located in the exhaust line 3, at least one unit of the exhaust after treatment system 16 can be located upstream from the heat exchanger 5.

For example, all units of the exhaust after treatment system 16 can be located upstream from the heat exchanger 5.

Alternatively, the exhaust line 3 could successively comprise, from the engine 2 towards the atmosphere: the second expander 12 of the turbocharger 11, a diesel particulate filter 17, the heat exchanger 5 of the waste heat recovery system 4, the first compressor 10 according to the invention, and a selective catalyst reduction device 18.

A significant advantage of the invention is that it makes it possible to improve the engine efficiency by reducing the back pressure in the exhaust, by using the thermal energy that is contained in an engine fluid and that would otherwise be lost.

Such an improvement over the prior art can be achieved with a fairly low number of components and without the implementation of costly or complex elements.

In the above mentioned embodiments, the energy recovered by the waste heat recovery system, i.e. the energy delivered by the expander, is entirely used for compressing exhaust gases. Nevertheless, it can be provided that part of the energy recovered by the waste heat recovery system is used for different purposes, in addition to the compression of exhaust gases. Indeed, for some operating phases of the engine arrangement, there may not be a significant advantage in compressing the engine exhaust gases, or the available energy might exceed the need of energy for compressing the exhaust gases.

Therefore, in one variant, the engine arrangement can be equipped with an additional expander in the waste heat recovery system, this additional expander being for example mechanically connected to an electric generator. The additional expander and the first expander could be arranged in parallel in the waste heat recover loop or in series, and could be operated either simultaneously, alternatively, or independently. With such an arrangement, the additional expander and the associated generator can be controlled to absorb any excess energy available from the working fluid in the waste heat recovery circuit and which cannot be efficiently used solely for compressing exhaust air through the first compressor.

In another variant, an electric machine can be mechanically connected to the first compressor and to the first expander. With such a machine being a generator, it can be controlled to absorb any excess energy available from the first expander and which cannot be efficiently used by the first compressor. When used as generator, the electric machine can also be used to limit the speed of the first compressor and of the first expander, for example if the current operating conditions in the waste heat recovery system would otherwise tend to drive them at an inadequate speed. If the electric machine can also be operated as a motor, it can be used to increase the speed of the first compressor, at least for a certain period of time, for example to further reduce the engine back pressure.

The variants relating to the use of an electric machine driven by the waste heat recovery system can be implemented with all previously described embodiments of the invention, especially regardless of the type of waste heat recovery system, of the engine fluid used as a heat source in the waste heat recovery system, of the presence or not of an additional intake compressor, and of the presence or arrangement an exhaust after-treatment system.

The invention is of course not limited to the embodiment described above as an example, but encompasses all technical equivalents and alternatives of the means described as well as combinations thereof.

The invention claimed is:

1. A vehicle internal combustion engine arrangement comprising:
    an internal combustion reciprocating piston engine, and an exhaust line configured to collect exhaust gases from the engine and direct the exhaust gases toward an atmosphere outside the engine arrangement;
    a waste heat recovery system carrying a working fluid in a loop, in which the working fluid is successively compressed, heated in a heat exchanger by means of thermal energy of at least one engine fluid, and expanded in a first expander;
    a first compressor located in the exhaust line and mechanically connected to the first expander of the waste heat recovery system,
    wherein the exhaust line passes through the heat exchanger, and wherein the first compressor is disposed between the heat exchanger and an outlet of the exhaust line leading to the atmosphere.

2. The engine arrangement according to claim 1, wherein the first compressor is directly mechanically driven by the first expander of the waste heat recovery system.

3. The engine arrangement according to claim 1, wherein the first compressor is mechanically connected to the first expander of the waste heat recovery system through a mechanical transmission.

4. The engine arrangement according to claim 1, wherein the heat exchanger is located in the exhaust line and in that the first compressor is located downstream from the heat exchanger.

5. The engine arrangement according to claim 1, wherein the waste heat recovery system is of the Rankine type in which the working fluid is carried in a closed loop, the heat exchanger comprising a boiler, and in that the waste heat recovery system further comprises a condenser which is arranged between the first expander and a pump, the pump being capable of compressing the working fluid before it enters the boiler.

6. The engine arrangement according to claim 1, wherein the first compressor is of the centrifugal type.

7. The engine arrangement according to claim 1, comprising a turbocharger including:
    a second expander located in the exhaust line upstream from the heat exchanger; and
    a second compressor mechanically linked to the second expander and located in an air intake line.

8. The engine arrangement according to claim 1, wherein the first compressor is independent from any expander located in the exhaust line upstream from the heat exchanger.

9. The engine arrangement according to claim 1, comprising an exhaust after treatment system located in the exhaust line and including several units, at least one unit being located upstream from the heat exchanger.

10. The engine arrangement according to claim 9, wherein the units comprise a diesel particulate filter and/or a selective catalyst reduction device.

11. Vehicle comprising an engine arrangement according claim 1.

12. A vehicle internal combustion engine arrangement comprising:
    an internal combustion reciprocating piston engine, and a main exhaust line configured to collect exhaust gases from the engine and direct the exhaust gases toward an atmosphere outside the engine arrangement;
    a waste heat recovery system carrying a working fluid in a loop, in which the working fluid is successively compressed, heated in a heat exchanger located in the main exhaust line by means of thermal energy of the exhaust gases, and expanded in a first expander,
    a first compressor located in the main exhaust line and mechanically connected to the first expander of the waste heat recovery system,
    a turbocharger including:
        a second expander located in the main exhaust line upstream from the heat exchanger; and
        a second compressor mechanically linked to the second expander and located in an air intake line,
    wherein the main exhaust line passes through the heat exchanger, and wherein the first compressor is disposed between the heat exchanger and an outlet of the main exhaust line leading to the atmosphere.

13. A vehicle internal combustion engine arrangement comprising:
    an internal combustion reciprocating piston engine, and a main exhaust line configured to collect exhaust gases from the engine and direct the exhaust gases toward an atmosphere outside the engine arrangement;
    a waste heat recovery system carrying a working fluid in a loop, in which the working fluid is successively compressed, heated in a heat exchanger located in the main exhaust line by means of thermal energy of the exhaust gases, and expanded in a first expander;
    a first compressor located in the main exhaust line and mechanically connected to the first expander of the waste heat recovery system, an exhaust after treatment system located in the main exhaust line and including several units, at least one unit being located upstream from the heat exchanger, wherein the main exhaust line passes through the heat exchanger, and wherein the first compressor is disposed between the heat exchanger and an outlet of the main exhaust line leading to the atmosphere.

* * * * *